United States Patent Office 3,126,318
Patented Mar. 24, 1964

3,126,318
SYNERGISTIC ANTIBIOTIC COMPOSITIONS AND
PREPARATION THEREOF
Marvin Legator, Modesto, Calif., assignor to Shell Oil
Company, New York, N.Y., a corporation of Delaware
No Drawing. Filed May 31, 1961, Ser. No. 113,598
4 Claims. (Cl. 167—65)

This invention relates to synergistic antibiotic compositions and to a method for their preparation. More particularly, it relates to a synergistic antibiotic composition comprising, in combination, an antibiotic of the group consisting of chloramphenicol, streptomycin and erythromycin, and $N^6$-benzyladenine.

The discovery and manufacture of antibiotics has revolutionized in recent years the medical treatment of many infections. The commonly used antibiotics are effective inhibitors of the multiplication of not only pathogenic microorganisms but also of a large number of other bacteria which compete with man and animals for their supply of food. An expanding field of application is before the animal nutritionist, the industrial bacteriologist, and the plant pathologist in the area of "non-medical uses" of antibiotics. The common "non-medical uses" of antibiotics include their use in animal feeds, as food preservatives, and in the control of plant pathogens.

The addition of antibiotics to animal feeds started with the observation that certain antibiotics such as the antibiotics produced by members of the genus Streptomyces, and synthetic derivatives thereof, for example, chlortetracycline, oxytetracycline, streptomycin and chloramphenicol, were able to improve the growth of animals. It was clear that a generalized effect of great potential usefulness had been discovered, because the growth effect occurred under practical conditions. The addition of antibiotics to commercial feeds passed rapidly into practice. The U.S. Tariff Commission reported that in 1954 approximately 280 tons of antibiotics were used in animal feed supplements alone.

Annually, a large amount of food is wasted because of spoilage due to microorganisms; indeed, microorganisms compete with animals and man for a supply of food. Various antibiotics such as, for example, chloramphenicol, chlortetracycline and oxytetracycline are widely used to lengthen the buying quality of beef, fish and poultry. Diseases of plants are of major importance in limiting the yields of fruits, vegetables and field crops. The use of antibiotics such as, for example, streptomycin, to control plant pathogens has come into prominence in recent years.

With the widespread use of antibiotics in animal feeds, as food preservatives, and in the control of plant pathogens, there exists the problem of antibiotic residues in human food. There may be residual amounts in the meat, milk, or eggs obtained from animals from either feed diets containing antibiotics or from treatment with therapeutic doses of antibiotics, or residues may be present in foods treated with antibiotics to prevent spoilage or to prevent plant diseases.

Since it is known that certain antibiotics produce deleterious side reactions in high doses in both animals and man; that the possibilities of sensitization by repeated small doses of antibiotics in foods or of provocation of reactions in individuals previously sensitized by medical use of antibiotics is a reality; that the emergence of resistant strains of pathogenic bacteria as a result of prolonged intake of antibiotics by host animals is occurring; and that the rise of resistant strains of bacteria which spoil man's food is on the increase, a need for antibiotic combinations which overcome these serious drawbacks to the use of antibiotics is readily apparent. If the amount of an antibiotic needed for "non-medical uses" could be reduced to still lower dosage levels than those currently employed, yet its activity increased, for example, approximately four to six-fold, some of the disadvantages and drawbacks to the "non-medical uses" of antibiotics could be overcome since less of the antibiotic would be needed to accomplish the desired purpose.

There has now been discovered, in accordance with this invention, a new synergistic antibiotic composition which may be used to overcome one or more of the aforementioned disadvantages inherent in the use of antibiotics alone. By "synergistic antibiotic composition" herein is meant an antibiotic composition comprising an antibiotic of the group consisting of chloramphenicol, streptomycin and erythromycin, and $N^6$-benzyladenine as synergist therefor in an amount sufficient to synergize the antibiotic and thus give to the resultant composition the characteristics of synergism. The compound "synergist" of the invention, $N^6$-benzyladenine, increases, multiplies, potentiates, or augments the efficiency or effectiveness of the antibiotic when combined, mixed, or contacted, therewith. By use of the $N^6$-benzyladenine, a relatively small dose of the antibiotic need be used, yet the result obtained will be that of a larger dose without the concomitant drawbacks of a large dose, e.g., deleterious side effects to the host organism. These new synergistic antibiotic compositions may well help to forestall the ever-increasing disadvantages and drawbacks to the "non-medical uses" of antibiotics.

Briefly, the synergistic antibiotic compositions of this invention comprise an antibiotic of the group consisting of chloramphenicol, streptomycin and erythromycin, and $N^6$-benzyladenine. The $N^6$-benzyladenine is used in an amount sufficient to synergize the antibiotic. The resulting benefit in use of the combination is unexpected, the effect being much more than the sum of the effect of each alone. An entirely unexpected result is produced by the combination. It has been postulated that the individual modes of action of the antibiotic and synergist may well be quite the opposite, as suggested by the antibiotic, chloramphenicol, and the synergist, $N^6$-benzyladenine. Chloramphenicol is known to inhibit protein synthesis and $N^6$-benzyladenine is known to increase protein synthesis or to prevent the normal rate of protein degradation. That one would obtain synergism by combining two components possessing such diverse modes of action does not appear to be suggested from their postulated individual modes of action.

It will be appreciated that $N^6$-benzyladenine exists in the form of tautomeric isomers having the equivalent structures represented by the formulae:

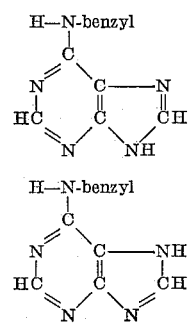

By the use of one of the two formulae, it is not intended to exclude the isomer of the other formula, reference to one of the two formulae being intended to include the tautomeric isomer.

$N^6$-benzyladenine is amphoteric and readily forms salts with both acids and bases. In some cases, it may be found preferable to employ a salt rather than the adenine itself. This usually will occur where it is found desirable to change the solubility of the adenine.

$N^6$-benzyladenine forms salts with acids generally. Thus, the salts of such inorganic acids as the halogen acids, particularly hydrochloric acid and hydrobromic acid, can be formed, as can the salts of such acids as sulfuric acid, phosphoric acid and boric acid. Both complete salts and partial salts can be formed. The salts of organic acids can also be used, examples of suitable acids being the aliphatic mono- and polycarboxylic acids (the alkane mono- and dicarboxylic acids of up to 10 carbon atoms are preferred), including those which are substituted as, for example, the halogenated acids, hydroxy-substituted acids, and the like, alkane and aryl sulfonic acids, phosphonic acids, phosphinic acids, phosphorous acid and its partial esters and the like.

The salts of bases include those of inorganic as well as organic bases. Salts of alkali metal bases and alkaline earth metal bases are particularly suitable, other salts of inorganic bases being the ammonia salts and salts of polyvalent metals. The quaternary ammonium salts, sulfonium salts, and phosphonium salts are also suitable.

$N^6$-benzyladenine, has been shown to increase or potentiate the in vitro antibiotic activity of Streptomycin-type antibiotics chloramphenicol, erythromycin and streptomycin.

Chloramphenicol at various concentrations with and without 50 p.p.m. of $N^6$-benzyladenine, has been evaluated. The standard serial tube dilution test was employed with B. subtilis as the assay organism. This test showed that $N^6$-benzyladenine increased the inhibitory activity of chloramphenicol on the assay organism approximately five-fold. Essentially, the same test as above was conducted using the agar diffusion method. In this evaluation, $N^6$-benzyladenine increased the activity of chloramphenicol on the assay organism approximately four- to six-fold. It is to be noted that in this latter test $N^6$-benzyladenine by itself at graduated levels showed no inhibitory action on the assay organism.

$N^6$-benzyladenine at various concentrations in combination with streptomycin and erythromycin was also evaluated. A potentiation effect was noticed with chloramphenicol as well as with streptomycin and erythromycin.

The in vitro effectiveness of $N^6$-benzyladenine in synergizing antibiotics is demonstrated by the following tests and their results. These tests involve synergistic antibiotic compositions encompassed by the invention which is more fully described and shown in the following examples. It is to be understood, however, that the examples are merely illustrations of the various compositions that can be prepared by the methods of this invention and are not to be construed as limiting the invention to the particular compositions specifically described.

EXAMPLE I

*Chloramphenicol and $N^6$-Benzyladenine*

The synergistic or potentiating effect of $N^6$-benzyladenine on chloramphenicol using the standard serial tube dilution test is now demonstrated.

A 1% solution of $N^6$-benzyladenine was made up in 10% acetic acid and 89% water. Two sets (A and B) of twenty-one tubes each, each tube containing 5 ml. of Emerson broth, were inoculated with a 24 hour growth of the assay organism, B. subtilis. To twenty-one of these tubes (set A), each tube containing the Emerson broth and B. subtilis, was added 0, 1, 2, 5, 10, 20, and 40 parts per million (p.p.m.) of chloramphenicol—this is to say, to each of three tubes was added 0 p.p.m. of chloramphenicol; to each of three other tubes was added 1 p.p.m. of chloramphenicol; and so forth, so that the above seven different concentrations were obtained with three tubes in each concentration bracket. To the other twenty-one tubes (set B), each containing Emerson broth and B. subtilis, was added from 0 to 40 parts per million of the above prepared 1% solution of $N^6$-benzyladenine in a like manner as above so that again seven different concentrations were obtained with three tubes in each concentration bracket. Both sets (A and B) of twenty-one tubes each were incubated for 16 hours at 37° C. Three tubes in each concentration bracket were run in order to more accurately check the results of this test, which are shown in Table I, as measured in observed visual growth.

TABLE I

| Tube Nos. | Chloramphenicol (p.p.m.) | B. Sutilis Growth(+) No Growth(−) | Tube Nos. | Chloramphenicol (p.p.m.) $N^6$-Benzyladenine (50 p.p.m.) | B. Subtilis Growth(+) No Growth(−) |
|---|---|---|---|---|---|
| 1–3 | 0 | + | 22–24 | 0 | + |
| 4–6 | 1 | + | 25–27 | 1 | + |
| 7–9 | 2 | + | 28–30 | 2 | + |
| 10–12 | 5 | + | 31–33 | 5 | − |
| 13–15 | 10 | + | 34–36 | 10 | − |
| 16–18 | 20 | − | 37–29 | 20 | − |
| 19–21 | 40 | − | 40–42 | 40 | − |

Table I shows that $N^6$-benzyladenine potentiates, augments or synergizes the antibiotic activity of chloramphenicol against B. subtilis. When 5 parts per million of chloramphenicol is used, no inhibition of B. subtilis growth is observed, but when 5 parts per million of chloramphenicol and 50 parts per million of $N^6$-benzyladenine is used, complete inhibition of B. subtilis growth is observed. From this test it may be seen that $N^6$-benzyladenine increased the inhibitory activity of chloramphenicol approximately five-fold.

EXAMPLE II

*Chloramphenicol and $N^6$-Benzyladenine*

The synergistic effect of $N^6$-benzyladenine on chloramphenicol using the agar diffusion method is now demonstrated, together with a check on $N^6$-benzyladenine alone.

A 1% solution of $N^6$-benzyladenine was prepared as in Example I. Three sets (C, D and E) of two plates each, each containing approximately the same amount of agar, were each inoculated with a 24-hour growth of the assay organism, B. subtilis. Again, two plates were run for each set in order to more accurately check the results of this test. To each of the two plates in set C, was added seven antibiotic assay disks, each impregnated with a different concentration of chloramphenicol from 0 to 100 parts per million, i.e., 0, 10, 20, 40, 60, 80 and 100 p.p.m.; to each of the two plates in set D, was added seven antibiotic assay disks, each inpregnated with a different concentration of chloramphenicol from 0 to 100 parts per million, i.e., 0, 10, 20, 40, 60, 80 and 100 p.p.m.; and each with 50 parts per million of $N^6$-benzyladenine; and to each of the two plates in set E was added a different concentration of $N^6$-benzyladenine from 0 to 100 parts per million, i.e., 0, 10, 20, 40, 60, 80 and 100 p.p.m. All of the plates were incubated for 6 hours at 37° C. The results of this test are shown in Table II, as measured in millimeters (mm.) of observed growth inhibition.

TABLE II

| Plate Nos. | SET C Chloramphenicol (p.p.m.)[1] | B. subtilis Growth Inhibition (mm.)[2] | Plate Nos. | SET D Chloramphenicol (p.p.m.) N⁶-Benzyladenine (50 p.p.m.) | B. subtilis Growth Inhibition (mm.) | Plate Nos. | SET E N⁶-Benzyladenine (p.p.m.) | B. subtilis Growth Inhibition (mm.) |
|---|---|---|---|---|---|---|---|---|
| 1-2 | 0 | 0-0 | 3-4 | 0 | 0-0 | 5-6 | 0 | 0-0 |
| 1-2 | 10 | 0-0 | 3-4 | 10 | 9-9 | 5-6 | 10 | 0-0 |
| 1-2 | 20 | 0-0 | 3-4 | 20 | 12-12 | 5-6 | 20 | 0-0 |
| 1-2 | 40 | 9-9 | 3-4 | 40 | 14-15 | 5-6 | 40 | 0-0 |
| 1-2 | 60 | 10-13 | 3-4 | 10 | 18-17 | 5-6 | 60 | 0-0 |
| 1-2 | 80 | 12-13 | 3-4 | 80 | 20-19 | 5-6 | 80 | 0-0 |
| 1-2 | 100 | 16-17 | 3-4 | 100 | 22-20 | 5-6 | 100 | 0-0 |

[1] Parts per million.  [2] Millimeters.

Table II, set C, shows, for example, that plate Nos. 1 and 2, each containing an antibiotic assay disk impregnated with 40 p.p.m. of chloramphenicol, inhibited the growth of *B. subtilis* around the chloramphenicol impregnated disk for approximately 9 mm., that is within a radius of 9 mm. from the edge of the disk, no *B. subtilis* growth was observed or measurable while growth was observed on each agar plate beyond this point. Table II, set D, shows, for example, that plate Nos. 3 and 4 each containing an antibiotic assay disk impregnated with 40 p.p.m. of chloramphenicol and 50 p.p.m. of N⁶-benzyladenine, inhibited the growth of *B. subtilis* around the chloramphenicol and N⁶-benzyladenine impregnated disk for approximately 14 and 15 mm., respectively, from the edge of the disk, for no *B. subtilis* growth was observed or measurable while growth was observed on each agar plate beyond this point. This is an increase of an average of 5.5 mm. over the chloramphenicol alone. Table II shows that in every case the activity of chloramphenicol when combined with N⁶-benzyladenine is greater than the same concentration of chloramphenicol alone. Thus, a synergistic composition composed of chloramphenicol and N⁶-benzyladenine is clearly shown. Also, it may be seen from Table II that plates 1 and 2, each containing 10 p.p.m. of only chloramphenicol, showed no zone of growth inhibition around the disk, whereas plates 3 and 4, each containing 10 p.p.m. of chloramphenicol and 50 p.p.m. of N⁶-benzyladenine, showed a zone of growth inhibition of 9 mm. each. It is to be particularly noted that N⁶-benzyladenine, as shown in Table II, set E, by itself at graduated levels from 0 to 100 p.p.m., showed no inhibitory action. In Table II, set D, it may be seen that N⁶-benzyladenine increased the inhibitory activity of chloramphenicol approximately four- to six-fold.

EXAMPLE III

*Chloramphenicol and N⁶-Benzyladenine*

Standard *S. aureus* assay plates were prepared similar to Example II. N⁶-benzyladenine at 0 p.p.m., 1 p.p.m. and 10 p.p.m. was mixed with Emerson agar. The agar was then divided into base and seed layers and 1.5 cc. of 24 hours growth of *S. aureus* was added to the seed layer. Antibiotic assay disks each containing 5 p.p.m. of chloramphenicol were used. The plates were incubated at 37° C. for 24 hours. Results:

| N⁶-Benzyladenine (p.p.m.) | Chloramphenicol (p.p.m.) | S. aureus Growth Inhibition (mm.) |
|---|---|---|
| 0 | 5 | 11 |
| 0 | 5 | 10 |
| 0 | 5 | 10 |
| 1 | 5 | 11 |
| 1 | 5 | 11 |
| 1 | 5 | 10 |
| 10 | 5 | 17 |
| 10 | 5 | 17 |
| 10 | 5 | 17 |

It may be seen that the antibiotic activity of chloramphenicol was potentiated by as much as 7 mm., that is, an increase in the zone of growth inhibition of as much as 7 mm. was observed.

EXAMPLE IV

*Streptomycin and N⁶-Benzyladenine*

As in Example III, using 2 p.p.m. of streptomycin as the antibiotic. Results:

| N⁶-Benzyladenine (p.p.m.) | Streptomycin (p.p.m.) | S. aureus Growth Inhibition (mm.) |
|---|---|---|
| 0 | 2 | 19 |
| 0 | 2 | 19 |
| 0 | 2 | 19 |
| 1 | 2 | 19 |
| 1 | 2 | 19 |
| 1 | 2 | 20 |
| 10 | 2 | 20 |
| 10 | 2 | 20 |
| 10 | 2 | 20 |

It may be seen that the antibiotic acitivity of streptomycin was potentiated by as much as 1 mm., that is, an increase in the zone of growth inhibition of as much as 1 mm. was observed.

EXAMPLE V

*Erythromycin and N⁶-Benzyladenine*

As in Example IV, using 2 p.p.m. of erythromycin as the antibiotic. Result:

| N⁶-Benzyladenine (p.p.m.) | Erythromycin (p.p.m.) | S. aureus Growth Inhibition (mm.) |
|---|---|---|
| 0 | 2 | 18 |
| 0 | 2 | 19 |
| 0 | 2 | 17 |
| 1 | 2 | 19 |
| 1 | 2 | 19 |
| 1 | 2 | 19 |
| 10 | 2 | 19 |
| 10 | 2 | 19 |
| 10 | 2 | 20 |

It may be seen that the antibiotic activity of erythromycin was potentiated by as much as 1.3 mm., that is, the zone of growth inhibition was increased by as much as 1.3 mm.

While the above examples illustrate specific embodiments of synergistic antibiotic compositions encompassed herein, it is to be understood that the invention is not to be limited to the exact details, as obvious modifications and equivalents will be apparent to one skilled in the art and this invention, therefore, limited only by the scope of the appended claims.

I claim as my invention:

1. An antibiotic composition comprising (*a*) an antibiotic of the group consisting of chloramphenicol, streptomycin and erythromycin and (b) N⁶-benzyladenine in the proportion of from about 0.2 to about 10 parts by weight of said adenine per part by weight of said antibiotic.

2. A composition according to claim 1 wherein the antibiotic is chloramphenicol.

3. A composition according to claim 1 wherein the antibiotic is streptomycin.

4. A composition according to claim 1 wherein the antibiotic is erythromycin.

References Cited in the file of this patent

UNITED STATES PATENTS

| | | |
|---|---|---|
| 2,653,087 | Skoog | Sept. 22, 1953 |
| 2,903,455 | Strong et al. | Sept. 8, 1959 |

OTHER REFERENCES

Lansford et al.: "Augmented Inhibition by Kinetin and Related Compounds of Growth of Pteridine-Inhibited *Lactobacillus arabinosus*," Arch, Biochem. and Biophys., vol. 73, pp. 191–197, 1958.

Skinner et al.: "Synergistic Effect of Gibberellin and 6-(Substituted) Purines on Germination of Lettuce Seed," Arch. Biochem. Biophys., vol. 74, pp. 283–285 (1958).

Skinner et al.: "Effect of 6-(Substituted) Purines and Gibberellin on the Rate of Seed Germination," Plant. Physiol., vol. 33, pages 190–194 (1958).

Skinner et al.: "Stimulation of Lettuce Seed Germination by 6-(Substituted)-Purines," Plant. Physiol., vol. 34, pp. 1–3 (1959).

Fusillo: "Growth of the Versatile Staphylococci, (I) Effect of Preformed Purines, Pyrimidines, and Essential Vitamins in the Presence or Absence of Subminimal Inhibitory Concentrations of Penicillin or Oxytetracycline in a Semisynthetic Medium, (II), as compared with Veal Infusion Medium," Antibiotics & Chemotherapy, vol. 5, pp. 480–489 (1955).

Gale: "Specific Inhibitors of Protein Synthesis," pp. 212–213, 219–223, 229–235 of "The Strategy of Chemotherapy," 8th Symposium, Soc. for General Microbiology, London, April 1958, University Press, Cambridge, Great Britain (1958) (POSL #QR–1–S6).

Lacey: "Mechanisms of Chemotherapeutic Synergy," pp. 247–259, of "The Strategy of Chemotherapy," 8th Symposium, Soc. for General Microbiology, London, April 1958, University Press, Cambridge, Great Britain (1958) (POSL #QR–1–S6).

Woodruff et al.: "The Antibiotic Approach—Sequential Blocking as an Explanation of Synergism—Prediction of Synergism Through Knowledge of Mechanism of Action of Antibiotics," pp. 36–42, 47–48, of "The Strategy of Chemotherapy," 8th Symposium, Soc. for General Microbiology, London, April 1958, University Press, Cambridge, Great Britain (1958) (POSL #QR–1–S6).

Di Marco et al.: "Influence of Pantothenic Acid and of Pyrimidine Bases on the Growth of *Staphylcoccus aureus*, Sperimentale 100, pp. 475–480 (1951), per Chem. Abstracts 45, #4776f (1951).

Mondolfo et al.: "Antagonism Between Aureomycin and Some Metabolic Factors (Adenine, etc.), Boll. ist, sieroterap. Milan, 34, pp. 536–540 (1955) per Chem. Abstracts 50, #6574e (1956).

Mondolfo et al.: "Vitamins and Other Factors Antagonistic to Aureomycin," Rev. Assoc. bioquim. Argentina, 20, pp. 3–6 (1955), per Chem. Abstracts 49, #16045b (1955).